United States Patent [19]

Baxter

[11] Patent Number: 4,693,820
[45] Date of Patent: Sep. 15, 1987

[54] MODULAR WATER CONDITIONING APPARATUS

[76] Inventor: Raymond D. Baxter, 6118 Via Nitos, Yorba Linda, Calif. 92686

[21] Appl. No.: 750,467

[22] Filed: Jul. 1, 1985

[51] Int. Cl.⁴ .............................................. B01D 27/08
[52] U.S. Cl. .................................. 210/232; 210/282; 210/287; 210/447; 210/457
[58] Field of Search ............... 210/282, 283, 287, 440, 210/443, 446, 447, 453, 457, 458, 450, 488, 232; 55/492, 503, 505

[56] References Cited

U.S. PATENT DOCUMENTS

| | | | |
|---|---|---|---|
| 2,110,318 | 3/1938 | Baruch | 210/287 |
| 2,605,901 | 8/1952 | Morrison | 210/131 |
| 3,250,397 | 5/1966 | Moltchan | 210/282 |
| 3,262,570 | 7/1966 | Gailitis et al. | 210/282 |
| 3,266,628 | 8/1966 | Price | 210/94 |
| 3,289,847 | 12/1966 | Rothemund | 210/282 |
| 3,415,382 | 12/1968 | Martin | 210/288 |
| 3,771,660 | 11/1973 | Smith | 210/287 |
| 3,780,867 | 12/1973 | Zirlis | 210/282 |
| 3,914,176 | 10/1975 | Holmes | 210/132 |
| 3,950,251 | 4/1976 | Hiller | 210/287 |
| 4,108,775 | 8/1978 | Wilkes et al. | 210/282 |
| 4,192,750 | 3/1980 | Elfes | 210/133 |
| 4,515,692 | 5/1985 | Chandler et al. | 210/288 |

Primary Examiner—Richard V. Fisher
Assistant Examiner—Wanda L. Millard
Attorney, Agent, or Firm—William L. Chapin

[57] ABSTRACT

A modular water conditioning apparatus for filtering or adding substances to water or similar fluids has a filter assembly with a hollow cylindrical casing extending perpendicularly upwards from a cylindrical base section. The base section has coaxial inlet and outlet tubes disposed perpendicularly outwards from opposite cylindrical walls of the base section. Within the base section, a hollow cylindrical boss, coupled to the outlet pipe, extends upwards. Cylindrical filter elements contained within the casing of the filter assembly are held in position and forced into sealing contact with the outlet boss by a cup spring pressed down on the upper surface of the filter element by a cap screwed down on the upper open end of the filter casing. Filter assemblies can be cascaded by inserting an outlet tube into the larger diameter inlet tube of an adjacent filter assembly.

24 Claims, 9 Drawing Figures

MODULAR WATER CONDITIONING APPARATUS

BACKGROUND OF THE INVENTION

1. Field of the Invention

This invention relates to equipment for treating and conditioning water. More particularly, the invention relates to devices for filtering undesired substances from water, and to devices intended to add nutrients and/or minerals to water used for horticultural purposes.

2. Description of Background Art

It is often required or desired to remove certain impurities from water to be used for human consumption. For example, water supplied to residences by municipal water works often contains naturally occurring organic matter which, while not necessarily harmful, can impart an undesirable taste to the water. This is especially true during summer months in which algae and vegetation in the lakes and rivers supplying water to a municipal system proliferate.

In addition to the innocuous but noxious organic matter which is sometimes contained in water supplied to homes and businesses, the water can sometimes contain more hazardous substances. These can include agricultural pesticides and herbicides which run off cultivated lands and contaminate sources of water destined for treatment and ultimate human consumption. Also, industrial chemicals sometimes find their way into the water supply.

Besides those foreign substances which can degrade the quality of water, certain chemicals are added to water by municipalities to reduce the bacteria count of the water to safe levels. Until recently, chlorine was used almost exclusively for this purpose.

Water containing chlorine is readily conditioned to make it safe for tropical fish. The procedure simply requires filling the tank with chlorinated water and allowing the water to stand in the tank for approximately 24 hours before putting fish into the tank. That period is usually sufficient to permit chlorine in the water to evaporate.

Now, however, many municipalities are adding chemicals known as chloramines to the water instead of chlorine, to achieve the desired germicidal effect. Water containing chloramines has a deleterious effect upon the operation of kidney dialysis machines, as well as on fish. The removal of chloramines can be a time consuming and cumbersome process, requiring as long as 30 days. Typically, the chloramine removal process requires adding a chemical to the water which decomposes the chloramines into ammonia and chlorine. The chlorine gas is then allowed to evaporate from the water. Finally, a zeolite must be added to the water to absorb the ammonia, a step that can require many days to be fully effective. Accordingly, a need exists for a water filtration apparatus which can effectively and rapidly remove chloramines from water, as well as naturally occurring and man-made substances.

Since there is no simple and cost-effective method of removing every type of foreign substance in a single filtration operation, it is usually required to conduct water through a series of individual filters, each particularly suited to removing a specific class of foreign substances from the water. Therefore, it would be desirable to have a water filtration apparatus which was modular in design, permitting the ready interconnection in series of those filter assemblies specific to each particular class of foreign substances it desired to remove from the water.

In all common flow-through water filters, there is an inherent pressure drop, due to the resistance of the filter media to the flow of water. When water filter assemblies are cascaded, i.e., connected in series, the pressure drops across the input to output port of each filter assembly are additive. This can result in a substantial loss of output pressure when multiple filter assemblies are cascaded. Accordingly, it would be desirable to have a filter apparatus in which multiple filters could be connected in series without causing an excessive cumulative pressure drop, or loss of pressure head.

In providing water for irrigating landscape foliage or crops, it is frequently necessary to add plant nutrients and/or mineral supplements to the water. For such applications, it would be desirable to have an apparatus which can efficiently add desired substances for enhancing the growth of plants to water issuing from the apparatus.

The present invention is responsive to the desired attributes of a water filtration and conditioning apparatus set forth above. How the invention fulfills the needs alluded to will become apparent from the description of the invention which follows.

OBJECTS OF THE INVENTION

An object of the present invention is to provide a modular water conditioning apparatus in which identical individual conditioning subassemblies may be readily interconnected in series. Another object of the invention is to provided a modular water conditioning apparatus in which interconnected subassemblies may contain variously and interchangeably cartridges or retainer chambers for loose media.

Another object of the invention is to provide a modular water filtration system in which cascaded identical filter housing subassemblies can be internally fitted with cartridge filters or loose media filters as desired.

Another object of the invention is to provide a modular water conditioning apparatus suited to adding nutrients or minerals to water flowing through the apparatus.

Various other objects and advantages of the present invention, and its most novel features, will become apparent to those skilled in the art by reading the accompanying specification, including the drawings and claims.

It is to be understood that although the invention disclosed herein is fully capable of achieving the objects and providing the advantages described, the characteristics of the invention described herein are merely illustrative of the preferred embodiments. Accordingly, I do not intend that the scope of my exclusive rights and privileges in the invention to be limited to the details of the embodiments described. I do intend that reasonable equivalents, adaptations and modifications of the various embodiments and alternate forms of the present invention which are described herein be included within the scope of the invention as defined by the appended claims.

SUMMARY OF THE INVENTION

Briefly stated, the present invention comprehends a modular water conditioning apparatus in which any desired number of identical filter holder assemblies may be readily connected in series. Each filter holder assembly includes a hollow cylindrical base with coaxial input and output ports perpendicularly disposed to the base. A hollow cylindrical casing which fits within the base and is fastened securely to it extends perpendicularly upward from the base. The upper end of the casing is sealed by a removable, coaxially threaded cap. A generally cylindrical filter cartridge, or alternatively, a retainer for loose filter media, is confined by compression means within the casing in the space between the base and cap. Fluid admitted under pressure to the input port of the filter holder assembly passes upwards around the filter cartridge or filter media retainer in the annular space between the inner cylindrical wall of the casing, and the outer wall of the smaller diameter filter cartridge or filter media retainer. Fluid passing through the filter cartridge or retainer exits through a centrally located, perforated tube or stand pipe. A bottom opening in the stand pipe sealingly engages a centrally located, open cylindrical boss within the base of the filter holder assembly. In that side of the boss opposite the inlet port, an opening communicates with the interior of a tube which extends outward from the base and comprises the outlet port. The outer diameter of the outlet port tube is of size permitting snug insertion within the inner diameter of the inlet port tube of second, adjacent filter holder assembly. Thus, any number of filter holder assemblies may be placed side by side, and the outlet port tube of each filter holder assembly save for the last one can be inserted into an adjacent inlet port tube, and cemented in place. In this manner, any desired number of filter assemblies containing any desired mix of cartridge filters or loose media filters can be assembled into a modular filter system.

DETAILED DESCRIPTION OF THE INVENTION

Figure 1:
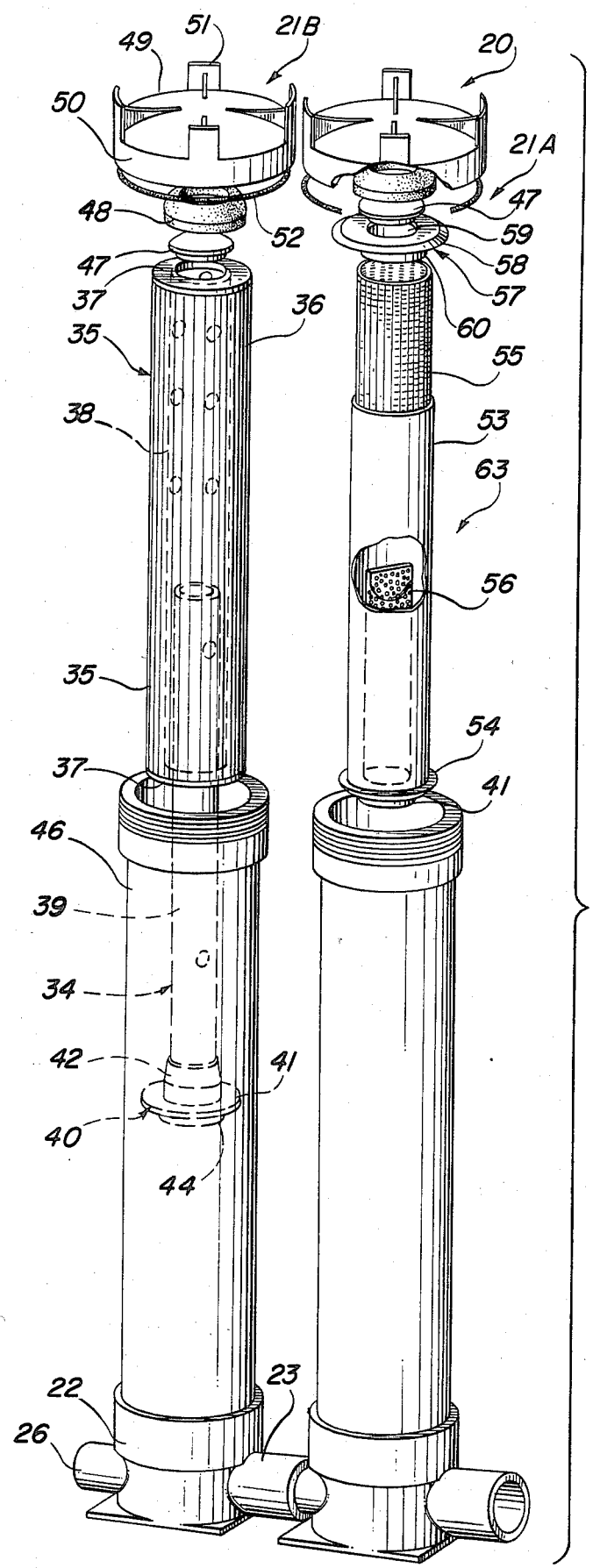
FIG. 1 is an exploded perspective view of the modular water conditioning apparatus according to the present invention.

Referring now to FIG. 1, a modular water conditioning apparatus 20 according to the present invention is shown to comprise a plurality of individual filter assemblies 21 which are interconnected in a series or cascaded fashion. As shown in FIG. 1, the external contruction and appearance of each filter assembly 21 is identical. However, the exploded portions of FIG. 1 show that the internal components and construction of different filter assemblies 21 may be different.

For example, the internal components of the filter assembly designated 21A are adapted to contain loose filter media, such as activated charcoal. On the other hand, the internal construction of the filter assembly designated 21B adapts that filter assembly to utilize filter cartridges made of paper or similar materials. A description of both types of filter assemblies is given below. The structure and operation of those elements common to both types of filter assemblies are discussed in the first filter assembly description only.

Figure 2:
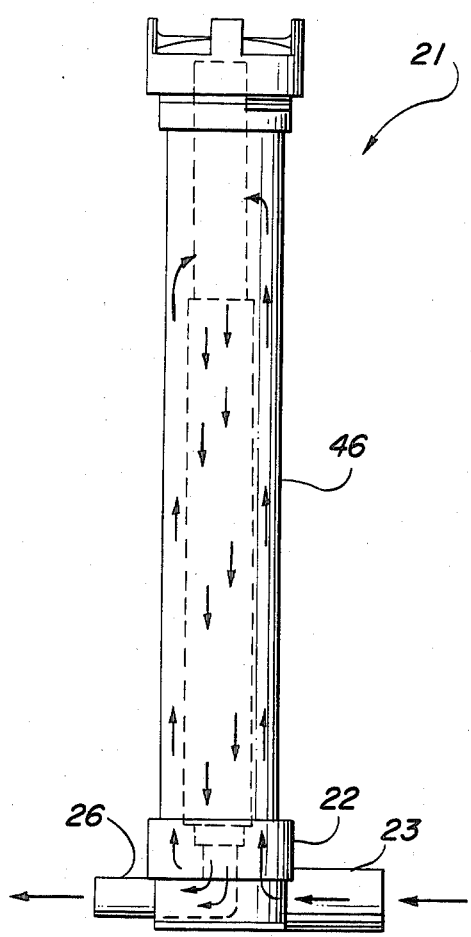
FIG. 2 is a front side elevational view of one type of individual filter assembly shown interconnected in FIG. 1.

Referring now to FIGS. 1 and 2, a filter assembly 21B adapted to utilizing filter cartridges made of paper or similar materials and comprising one component of a modular water conditioning apparatus 20 is shown. As shown in FIGS. 1 and 2, filter assembly 21B includes a hollow cylindrical base 22. The bottom opening of the cylindrical portion of base 22 is sealed with a flat base plate, while the upper opening is adapted to receive a circular outer cross section pipe. Extending perpendicularly outward from a rear wall of cylindrical base 22 is a hollow cylindrical inlet tube 23. Bore 24 of inlet tube 23 communicates with perpendicularly disposed bore 25 of cylindrical base 22.

A hollow cylindrical outlet tube 26 extends perpendicularly outward from a front wall of cylindrical base 22, opposite inlet tube 23. Outlet tube 26 is coaxial with inlet tube 23, and has a outer diameter slightly smaller than diameter of bore 24 of inlet tube 23. Thus, as shown in FIG. 1, the outlet tube 26 of one filter assembly 21 may be inserted into the bore 24 of inlet tube 23 of an adjacent filter assembly 21. Coupled inlet and outlet tubes may then be cemented or welded together. In this manner, any desired number of filter assemblies 21 may be interconnected in series by joining their bases 22 together as has been described.

Figure 3:
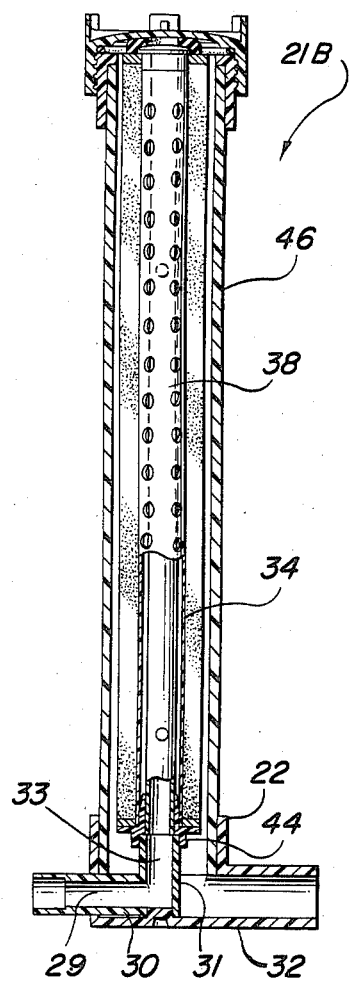
FIG. 3 is a partially sectional front side elevational view of the apparatus of FIG. 2.
Figure 5:
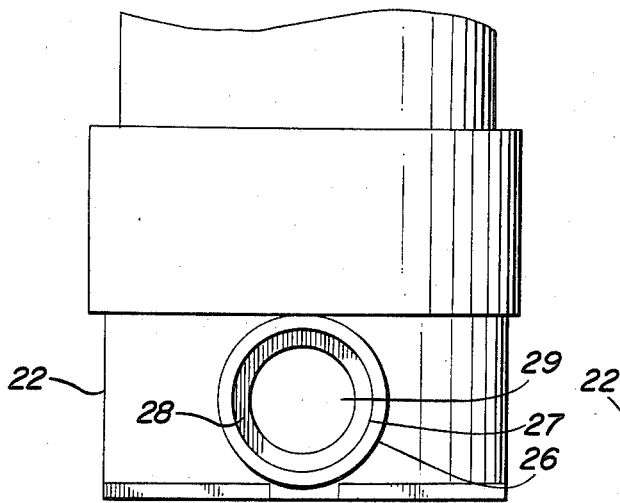
FIG. 5 is a fragmentary front elevation view of the apparatus of FIG. 2.
Figure 6:
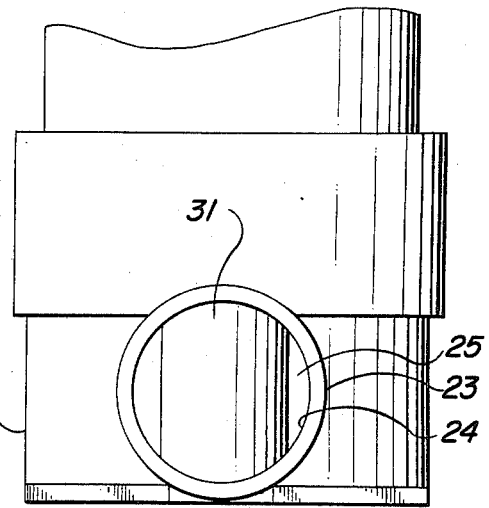
FIG. 6 is a fragmentary rear elevation view of the apparatus of FIG. 2.

As may be seen beset by referring to FIGS. 2, 3 and 5, outlet tube 26 has an inner bore 27. The diameter of bore 27, which extends inward from the outer transverse face of outlet tube 27, is constant for an appreciable axial distance inward. Approximately midway between the outer transverse face of outlet tube 26 and the outer cylindrical wall of hollow cylindrical base, bore 27 abruptly terminates at annular flange 28. A smaller diameter, inner bore 29 coaxial with and communicating with bore 27 forms the inner surface of a smaller diameter cylindrical connecting tube 30.

Connecting tube 30 extends inward through the cylindrical wall of hollow cylindrical base 22, and joins a cylindrical boss 31 which extends upward from the upper, inner surface of disc-shaped bottom portion 32 of base 22. Boss 31 is centrally located on disc-shaped bottom portion 32 of base 22. In other words, boss 31 is coaxial with both the cylindrical walls and disc-shaped bottom portion 32 of base 22.

A blind coaxial cavity in boss 31 has bore 33 open at the top transverse face of the boss. Bore 33 communicates with perpendicularly disposed bore 29 of connecting tube 30.

As shown in FIGS. 1, 2 and 3, the outer casing for filter assembly 21B comprises a hollow cylindrical pipe 46 which fits coaxially downward into the circular opening in the upper transverse face of hollow cylindrical base 22. Casing pipe 46 is preferably fabricated from PVC plastic, and is fastened to base 22 by adhesive cement.

As may be seen best by referring to FIG. 1, filter assembly 21A includes internal components for holding loose filter media, while filter assembly 21B includes internal components for holding a cartridge type paper filter. Referring now again primarily to FIG. 3, those components unique to filter assembly 21B will be described.

As shown in FIG. 3, filter assembly 21B includes a hollow, cylindrical stand pipe 34 adapted to fit within a cylindrical cartridge filter 35. Cartridge filter 25 has a permeable filter element 36 made of paper or other fabric-like material. Filter element 36 is folded accordian style in a circular pattern, with the fold lines extending longitudinally and the layers of doubled over material extending radially from the cylindrical axis of the filter. Opposite longitudinal ends of filter element 36 are imbedded in the inner facing annular faces of ring-shaped discs 37, which serve as end plates for cartridge filter 35. A perforated plastic tube 38 extends axially between end plates 37 and is joined thereto. The inner radial surfaces of the folds of filter element 36 lie adjacent to the outer surface of tube 38.

The outer cylindrical surface of stand pipe 34 is of the proper circumference to fit loosely within the inner cylindrical surface of cartridge filter tube 38. As may be seen best by referring to FIGS. 2 and 3, stand pipe 34 includes a hollow perforated tube 39 fastened to a circular transverse cross-section base 40.

Stand pipe base 40 is preferably fabricated of polyvinyl chloride (PVC) plastic by injection molding. As shown in the Figures, stand pipe base 40 has a generally disc-shaped central section 41. Extending coaxially upward from the upper surface of central section 41 is a hollow cylindrical boss 42. Boss 42 has an inner bore 43 which passes completely through central section 41. Bore 43 is of the proper diameter to snugly receive perforated stand pipe tube 39. Stand pipe tube 39 is preferably made of PVC, and is preferably secured to boss 42 by an annular adhesive bond.

The outer diameter of the base of hollow cylindrical boss 42 is of the proper size to fit snugly within cartridge filter tube 38. To facilitate insertion of boss 42 into cartridge filter tube 38, approximately the upper half of boss 42 tapers to a smaller diameter outer diameter at the top transverse surface of the boss.

A ring-shaped flange 44 of larger inner diameter than the diameter of bore 43 extends coaxially downward from the lower surface of central section 41 of stand pipe circular base 40. The bore 45 of flange 44 tapers from one diameter at the lower entrance opening of flange 44 to a smaller diameter where the upper end of the flange joins the lower surface of central section 41. Bore 45 is of the proper diameter to fit snugly over the outer cylindrical surface of cylindrical base boss 31, which has a taper complementary to that of bore 45.

Now to aid in the description of the structural and functional interrelationships between the various components of filter assembly 21B, including both those components previously described and additional components to be described below, a sequence for assembling those components will now be described. It is to be understood that the actual assembly sequence for the filter assemblies according to the present invention can differ from that sequence of steps which is set forth here merely to facilitate an understanding of the invention.

Referring now to FIGS. 1, 2 and 3, stand pipe 34 is inserted axially downward into casing 46, sliding ring shaped flange 44 on the bottom of stand pipe base 40 over the outer cylindrical surface of base boss 31. When the upper transverse face of base boss 31 abuts the annular region of the bottom surface of central section 41 of stand pipe base lying between the inner diameter circumference of flange 44 and the inner bore 43 of hollow cylindrical boss 42, further downward movement of stand pipe 34 is halted.

Next, cylindrical cartridge filter 35 is slid downward over perforated outlet tube 39 of stand pipe 34. A circular cartridge plug 47 is then inserted into the upper transverse opening in cartridge tube 38. Cartridge plug 47 is preferably injection molded from PVC plastic. Plug 47 is a generally dome-shaped, circular cap having a downwardly depending ring-shaped flange. The outer diameter of the flange is smaller than that of the cap, and adapts the flange to fit snugly within the hole in the top of cartridge tube 38.

A "cup spring" 48 in the shape of an inverted, cup-shaped ring with a central hole and fabricated from neoprene or similar elastomeric material has an inner skirt diameter which permits it to fit loosely around the cap of cartridge plug 38.

The upper, threaded end of hollow cylindrical casing 46 is sealed by means of filter cap 49. Filter cap 49, which is preferably molded from PVC plastic, is a generally domed-shaped circular disc with a downwardly depending, internally threaded skirt flange 50. Four lugs 51 extending perpendicularly upward at ninety-degree spacings from the outer circumference of the top surface of filter cap 49 give it a castellated appearance, and provide convenient grasping surfaces with which to apply tightening or loosening torque to cap 49.

An elastomeric O-ring 52 fits within filter cap 49 at the bottom of threaded skirt 50. When cap 49 is screwed down on casing 46, O-ring 52 is compressed between the annular top surface of casing 46 and the bottom disc-shaped surface of filter cap 49 lying at the bottom of threaded skirt 51. Cold flow of O-ring 52 into any voids between mating surfaces of casing 46 and filter 49 insures production of a water-tight union between casing and filter cap.

Tightening cap 49 onto the threaded upper end of filter tube casing 46 also compresses cup spring 48 against the upper transverse annular surface of filter cartridge tube 38. Now the lower transverse annular surface of filter cartridge tube 38 abuts the upper surface of central disc-shaped section 41 of stand pipe 40. Therefore, the downward compressive force exerted by cup spring 48 forces stand pipe base 40 into intimate, sealing contact with boss 31 of base 22. Thus the present invention affords a novel method of simultaneously effecting water tight seals at both the upper filter element access opening and at the union between the stand pipe tube and outlet port boss, merely by tightening filter cap 49 onto casing 46.

FIG. 2 illustrates the paths taken by water flowing through filter assembly 21B constructed according to the present invention. As shown in FIG. 2, raw water is introduced under pressure through inlet tube 23 into the interior of hollow cylindrical base 22. From the interior region of base 22, water flows upwards through the elongated annular space between the outer surface of cylindrical cartridge filter 35 and the inner cylindrical surface of casing pipe 46. The pressure of water in that annular space forces it radially inward through permeable filter element 36, and then radially inward through holes in the wall of perforated plastic filter cartridge tube 38. Pressurized water exiting those holes enters the elongated annular space between the inner cylindrical surface of filter cartridge tube 38 and the outer cylindrical surface of stand pipe perforated outlet tube 39.

Water in that space flows radially inward through holes in perforated stand pipe outlet tube 39 and longitudinally downward through the tube. Water flowing through the bottom opening of bore 43 in stand pipe base 40 enters bore 33 of cylindrical base boss 31, and then changes direction to flow out at right angles through bore 27 of outlet tube 26.

Conditioned water exiting through outlet tube 26 may be utilized as desired. Alternatively, as shown in FIG. 1, any desired mixture of filter assemblies 21B and 21A can be easily connected in series to perform any desired number of sequential water conditioning operations, as has been previously described. Thus, the modular water conditioning apparatus according to the present invention has novel features enabling the ready interconnection of various filter assemblies into a cascaded configuration.

Another important advantage of the present invention is the modularity of design incorporated into each filter assembly itself. For example, existing water filter assemblies frequently produce excessive pressure drops. It is not uncommon for existing units to have pressure drops of 5 to 6 psi. Cascading 4 such units would result in a total pressure drop of 20-24 psi, which would be unacceptably large for many applications. In contrast, the modular design of filter assemblies according to the present invention permit adjusting the pressure drop to any reasonably low value. This may be done merely by making casing pipe 46, stand pipe tube 39 and cartridge filter 35 longer, all other elements of the filter assembly remaining the same. Alternatively, multiple cartridge filter 35 can be stacked in series, requiring only the lengthening of casing pipe 46 and stand pipe tube 39 to achieve the desired increase in transverse filter area and accompanying reduction in back pressure created by the filter. By using filter cartridge lengths of approximately 19", I have been able to achieve pressure drops as small as 1.25 psi per filter assembly. The flexibility offered by the present invention in controlling filter pressure drops is possessed both by cartridge filter assembly 21B, which has been described above, and by filter assembly 21A, which will now be described.

Figure 4:
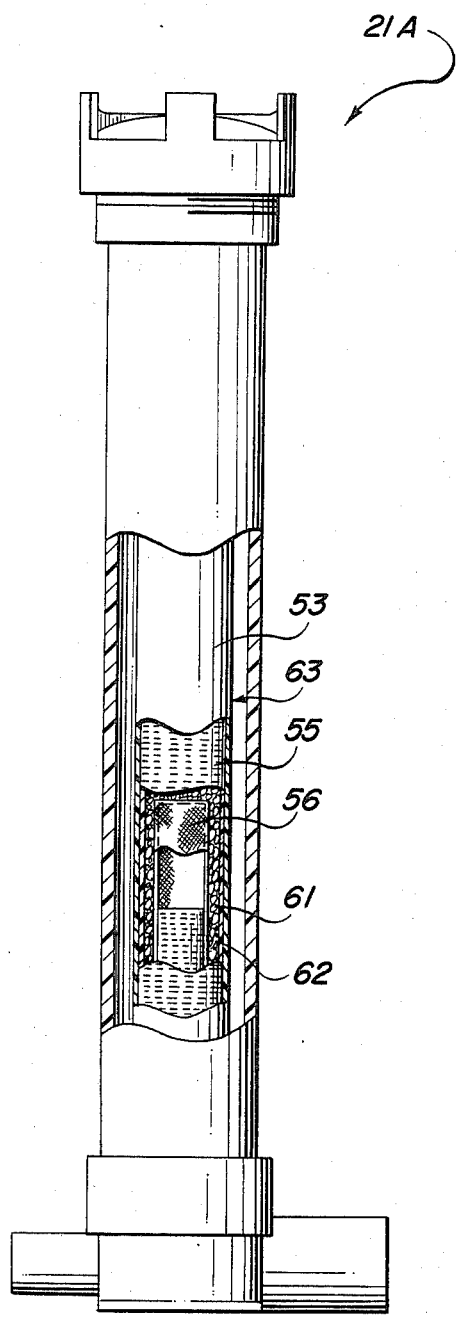
FIG. 4 is a fragmentary, partially sectional front side elevation view of a second type of individual filter assembly shown interconnected in FIG. 1.
Figure 7:
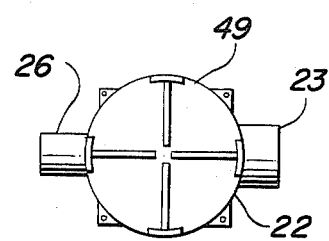
FIG. 7 is a bottom view of the apparatus of FIG. 2.
Figure 8:
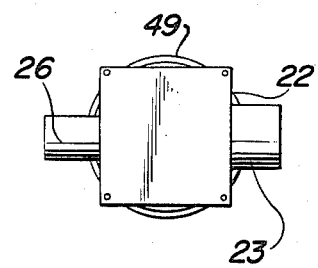
FIG. 8 is a top view of the apparatus of FIG. 2.

Filter assembly 21A, shown in FIG. 4, is designed to accommodate loose filter media such as activated charcoal. Alternatively, filter assembly 21A may be used to contain nutrients, fertilizers or minerals which it is desired to add to water used for agricultural or horticultural purposes.

As shown in FIG. 4, filter assembly 21A includes a cylindrical retainer sleeve 53. Retainer sleeve 53 is preferably fabricated as an extrusion from an impervious, durable plastic such as polyethylene or polypropylene. The lower end of retainer sleeve 53 is inserted into a beveled PVC flange ring 54, and both flange ring and sleeve end are cemented to the upper surface of central section 41 of stand pipe circular base 40, which latter two elements have been described in detail above in the discussion of filter assembly 21B.

Fitting coaxially within sleeve 53 and extending a substantial distance beyond the upper, open end of sleeve 53 is a perforated cylindrical insert 55. Insert 55 is preferably fabricated from a durable plastic material such as polyethylene of polypropylene, and contains a regular pattern of tiny holes over its entire cylindrical surface. The lower annular surface of perforated insert 55 is cemented to the upper surface of central section 41 of stand pipe circular base 40.

A screen outlet tube 56 is cemented within bore 43 of hollow cylindrical boss 42. The bottom end of screen outlet tube 56 is flush with the bottom surface of central section 41 of stand pipe base 40. Screen outlet tube 56 extends coaxially upward within perforated cylindrical insert 55, to a distance approximately midway between the upper and lower ends of insert 55. Screen outlet tube 56 is fabricated from a flexible perforated plastic material such as polyethylene or polypropylene. The upper end of screen outlet tube 56 is sealed, preferably by pinching the cylindrical walls of the tube together and cementing their inner surfaces together.

The upper, open end of perforated cylindrical insert is closeable with a cap 57. Cap 57 has the shape of a flat disc 58 with a centrally located hole 59 and a downwardly depending ring-shaped flange 60. The outer diameter of flange 60 is of the proper size to form a snug fit within the inner circumferential hole of insert 55 when the flange is inserted downward into the open upper end of the insert.

Hole 59 is cap 57 is sealable by cartridge plug 47, the latter element having been described above for filter assembly 21B. Thus sealed, an elongated annular space 61 is formed, said space extending longitudinally between the upper surface of central section 41 of stand pipe base 40 and the lower surface of cap 57, and radially between the outer cylindrical surface of screen outlet tube 56 and the inner cylindrical surface of perforated cylindrical insert 55. Annular space 61 may be filled with activated charcoal 62 or other filter or water conditioning media whose minimum particle size is greater than the size of the largest perforations in either perforated cylindrical insert 55 or screen outlet tube 56. With retainer sleeve 53 and associated elements 54-62 assembled as has been described, a cartridge-like retainer assembly 63 is formed which is insertable and removable into casing 46 of filter assembly 21A exactly as has been described above for cartridge filter 35 in filter assembly 21B. Retainer chamber assembly 63 is held in compression within casing 46 by cup spring 48, and casing 46 and stand pipe base 40 are sealed exactly as has been described above for filter assembly 21B.

As shown in FIG. 4, the path of water flow into filter assembly 21A is similar to that described for filter assembly 21B. However, in filter assembly 21A, water having entered the annular space between casing 46 and retainer sleeve 53 enters radially only through that portion of perforated cylindrical insert 55 which extends beyond the upper edge of cylindrical retainer sleeve 53.

Figure 9:
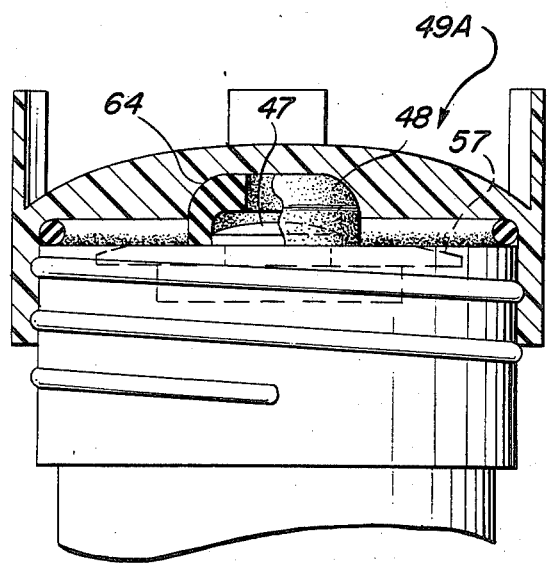
FIG. 9 is a fragmentary, partially sectional front side elevation view of a modification of the apparatus of FIG. 2.

FIG. 9 illustrates a modification of filter cap 49. In that modification, filter cap 49A includes a centrally located concave depression 64 in the lower inside surface of the cap. Depression 64 is of the proper size and shape to fit conformally over the upper surface of cup spring 48, thereby insuring that cup spring 48 will be radially centered when cap 49 is screwed on casing 46. Since in both filter assembly 21A and 21B, the lower open skirt of cup spring 48 bears against the outer circular edge of cartridge plug 47 when the cup spring is compressed downward, centering the cup spring insuring that filter cartridge 35 or filter retainer assembly 63 will be radially centered within casing 46.

What is claimed is:
1. A filter assembly for fluids comprising:
(a) an elongated hollow cylindrical casing having an open upper end,
(b) a hollow cylindrical base sealed at its lower end by a generally flat base plate and sealingly joined at its upper end to the lower end of said casing, said hollow cylindrical base being coaxial with said hollow cylindrical casing, and said hollow interior of said casing communicating with the hollow interior of said base,
- (c) a hollow cylindrical boss positioned coaxially and concentrically on the upper inner surface of said base plate of said base, within the hollow interior of said base, said boss having an open upper end,
- (d) a hollow outlet tube communicating with the interior of said boss, said hollow outlet tube extending radially outwards from said boss beyond the cylindrical wall of said hollow cylindrical base,
- (e) a hollow inlet tube communicating with the generally annular shaped hollow interior region of said base between its interior walls and the outer surfaces of said boss and said outlet tube, said outlet tube being coaxial with said inlet tube and extending radially outwards from the cylindrical wall of said hollow cylindrical base in a direction diametrically opposed to the extension direction of said inlet tube,
- (f) an elongated hollow cylindrical filter element holder having an axial passageway adapted to couple sealingly to the hollow interior of said boss,
- (g) means for sealingly connecting said passageway in said filter element holder to said interior of said boss, and
- (h) means for sealing said open upper end of said elongated hollow cylindrical casing.

2. The apparatus of claim 1 wherein said means for sealing said open upper end of said hollow casing comprises a cap having an inner transverse surface which may be tightly compressed against the upper transverse surface of said casing and means for compressively forcing said inner transverse surface of said cap tightly against the upper transverse surface of said casing, thereby effecting a fluid tight seal between said cap and said casing.

3. The apparatus of claim 1 wherein said means for sealingly connecting said passageway in said filter element holder to said interior of said boss comprises:
- (a) a cylindrical flange extending downward from the bottom transverse surface of said filter element holder, said flange being of the proper circumferential dimensions to fit snugly over the outer cylindrical surface of said boss, and
- (b) means for compressively forcing the bottom transverse surface of said filter element holder tightly against the upper transverse surface of said boss, thereby effecting a fluid-tight seal between said filter element holder and said boss.

4. The apparatus of claim 3 wherein one compressive force means is effective in providing the compressive force required both to seal said open upper end of said elongated hollow casing, and for sealing connecting said passageway in said filter element holder to said interior of said boss.

5. The apparatus of claim 2 wherein said means for compressively forcing said inner transverse surface of said cap tightly against the upper transverse surface of said casing comprises a helically threaded cap member and a complementarily threaded member fixed in relation to said base of said apparatus, whereby screwing said complementarily threaded members together causes said cap and said casing to move axially towards one another.

6. The apparatus of claim 3 wherein said filter element holder is further defined as having fixed to the upper surface of said flange an annular ring having a generally flat upper surface, said annular ring being adapted to receive a downward compressive force exertable axially downward through the elongated cylindrical wall of an elongated cylindrical filter element which may be slid coaxially downwards over said hollow filter element holder.

7. The apparatus of claim 6 wherein said means for compressively forcing the bottom transverse surface of said filter element holder tightly against the upper transverse surface of said boss comprises means for applying a downward compressive force to the upper transverse face of said cylindrical filter element.

8. The apparatus of claim 7 wherein said means for applying a downward compressive force to the upper transverse face of said cylindrical filter element comprises:
- (a) a cap for sealing said upper end of said hollow casing,
- (b) a resilient compressive member extending between a portion of the lower transverse surface of said cap and a portion of the upper transverse surface of said cylindrical filter element, whereby moving said cap axially downward to seal said upper end of said hollow casing applies through said resilient member a downward axial force to the upper transverse surface of said cylindrical filter element, and
- (c) means for compressively forcing the inner transverse surface of said cap tightly against the upper transverse surface of said casing.

9. The apparatus of claim 8 wherein said means for compressively forcing said inner transverse surface of said cap tightly against the upper transverse surface of said casing comprises a helically threaded cap member and a complementarily threaded member fixed in relation to said base of said apparatus, whereby screwing said complementarily threaded members together causes said cap and said casing to move axially towards one another, applying an axial downward force on said resilient member extending axially between said cap and said upper transverse surface of said cylindrical filter element.

10. The apparatus of claim 1 wherein the outer diameter of that portion of said outlet tube extending radially outwards from the cylindrical wall of said hollow cylindrical base is of the proper size to permit said outlet tube to slide coaxially inwards into the bore of said inlet tube extending radially outwards from the opposite cylindrical wall of said hollow cylindrical base, thereby facilitating the series connection of a plurality of the apparatus described.

11. A filter assembly for fluids comprising:
- (a) a hollow, cylindrical base truncated and sealed at its lower surface by a flat base plate,
- (b) a hollow inlet tube extending perpendicularly outward through a cylindrical wall surface of said base, the interior of said inlet tube communicating with the hollow interior of said base,
- (c) a hollow cylindrical boss centrally positioned on the upper inner surface of said base plate, said boss having an open upper end,
- (d) a hollow outlet tube coaxial with said inlet tube extending perpendicularly outward through an opposite cylindrical wall surface, said outlet tube having a smaller diameter bore communicating with the hollow interior of said boss, (e) an elongated hollow cylindrical casing coaxial with said cylindrical base and extending upwards therefrom, the bore of said casing communicating with the hollow interior of said cylindrical base, said casing and said base being joined together in a sealing engagement, (f) a filter support member having a ring-shaped base section with a generally flat upper surface, and a hollow cylindrical tube section disposed perpendicularly upward from said flat upper surface through the center of said ring-shaped base section, (g) means for sealingly connecting the inner bore of said hollow cylindrical tube section in said filter support member to said hollow interior of said boss, and (h) means for sealing said open upper end of said elongated hollow casing, wherein the outer diameter of that portion of said outlet tube extending perpendicularly outward from the cylindrical wall of said hollow cylindrical base is of the proper size to permit said outlet tube to slide coaxially inwards into the bore of said inlet tube extending perpendicularly outwards from the opposite cylindrical wall of said hollow cylindrical base, thereby facilitating the series connection of a plurality of apparatus described.

12. The apparatus of claim 11 wherein said means for sealingly connecting said filter support member to said hollow interior of said boss comprises:

(a) a cylindrical flange extending downward from the bottom transverse surface of said base section of said filter support, said flange being of the proper diameter to fit snugly over the outer cylindrical surface of said boss, and (b) means for compressively forcing the bottom transverse surface of said filter support base section tightly against the upper transverse annular surface of said boss, thereby effecting a fluid tight seal between said filter support and said boss.

13. The apparatus of claim 12 wherein said means for sealing said open upper end of said elongated hollow casing comprises:

(a) a helically threaded cap member, and (b) a complementarily threaded member fixed axially in relationship to said base, whereby screwing said complementarily threaded members together causes said casing and said cap member to move axially towards one another in a sealing engagement.

14. The apparatus of claim 13 wherein said means for sealing said open upper end of said elongated hollow casing comprises:

(a) a cylindrical dome-shaped cap member having axially disposed internal helical threads on its inner cylindrical surface, and (b) an upper end portion of said elongated hollow casing having axially disposed external helical threads complementary to said internal helical threads in said dome-shaped cap member, thereby permitting said dome-shaped cap member to be screwed down onto the threaded upper end portion of said elongated hollow casing.

15. The apparatus of claim 14 wherein said hollow cylindrical tube section contains a plurality of holes in the cylindrical wall of said tube.

16. The apparatus of claim 15 further comprising an elongated cylindrical filter cartridge, said filter cartridge having:

(a) an elongated, perforated central tube disposed coaxially around the longitudinal center line of said filter cartridge, (b) an upper, flat ring-shaped disc having a central aperture receiving the upper end of said tube and fastened flush thereto, (c) a lower, flat ring-shaped disc having a central aperture receiving the lower end of said tube and fastened flush thereby, (d) a permeable filter material disposed axially between the inner, facing annular surfaces of said upper and lower ring-shaped discs, said filter material circumferentially encircling said perforated central filter cartridge tube, and (e) a circular cross section, disc-shaped stopper having a downwardly depending flange and adapted to sealing insertion into the upper open end of said perforated central filter cartridge tube, whereby said perforated central filter cartridge tube may be slid downward over said elongated hollow filter support tube sufficiently far for the lower annular surface of said lower ring-shaped filter cartridge disc to abut the upper annular surface of said disc-shaped transverse filter support base section.

17. The apparatus of claim 16 wherein said means for compressively forcing the bottom transverse surface of said filter support base section tightly against the upper transverse annular surface of said boss comprises a resilient member extending axially between the lower transverse face of said dome-shaped cap member and the upper transverse surface of said upper, ring-shaped cartridge filter disc.

18. The apparatus of claim 17 wherein said resilient member is a dome-shaped, elastomeric ring having a central hole conformable around the outer circumference of said cartridge aperture stopper.

19. The apparatus of claim 18 further comprising an elastomeric O-ring conformably fittable within said dome-shaped cap member above said upper annular transverse surface of said filter cartridge.

20. The apparatus of claim 19 wherein said dome-shaped cap member has a plurality of generally rectangular lugs extending perpendicularly upwards above the body of said cap member at regular intervals around the outer circumferential surface of said cap member.

21. The apparatus of claim 15 further comprising an elongated cylindrical filter retainer adapted to receive loose filter media, said cylindrical filter retainer comprising:

(a) an elongated, hollow cylindrical retainer sleeve fabricated from impervious material fastened coaxially to the upper transverse surface of said ring-shaped base section of said filter support member and extending upwards therefrom coaxial with said tubular central section of said filter support member, (b) an elongated, hollow cylindrical inner sleeve having a plurality of regular spaced perforations through its walls and fitting coaxially within said retainer sleeve and extending a substantial distance beyond the upper open end of said retainer sleeve, (c) an elongated, hollow cylindrical output tube of substantially smaller diameter than said inner sleeve, said output tube having a plurality of regularly spaced perforations through its cylindrical walls, said output tube extending perpendicularly upwards from the upper transverse surface of said ring-shaped base section of said filter support member, the bore of said output tube being in communication with and coaxial with the bore of said tubular central section of said filter support member, and said output tube having a closed upper end, (d) a retainer cap for sealing the upper open end of said retainer sleeve, said retainer cap having flat ring-shaped disc section with a longitudinally disposed, centrally positioned hole, and a downwardly depending ring-shape flange of the proper diameter to fit snugly within said upper open end of said retainer sleeve, and (e) a circular cross section, disc-shaped stopper having a downwardly depending flange and adapted to sealing insertion into said centrally positioned hole in said retainer cap.

22. The apparatus of claim 21 wherein said means for compressively forcing the bottom transverse surface of said filter support member base section tightly against the upper transverse annular surface of said boss comprises a resilient member extending axially between the lower transverse face of said dome-shaped cap member and the upper transverse surface of said retainer cap.

23. The apparatus of claim 22 where said resilient member is a dome-shaped elastomeric ring having a central hole conformable around the outer circumference of said retainer cap stopper.

24. The apparatus of claim 23 wherein said dome-shaped cap member has a plurality of generally rectangular lugs extending perpendicularly upwards above the body of said cap member at regular intervals around the outer circumferential surface of said cap member.

* * * * *